(12) United States Patent
Cariou et al.

(10) Patent No.: US 10,172,164 B2
(45) Date of Patent: Jan. 1, 2019

(54) SPATIAL REUSE WITH TRAINING IN RTS-CTS

(71) Applicant: Intel IP Corporation, Santa Clara, CA (US)

(72) Inventors: Laurent Cariou, Portland, OR (US); Solomon B. Trainin, Haifa (IL); Ou Yang, Santa Clara, CA (US); Assaf Kasher, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 23 days.

(21) Appl. No.: 15/282,340

(22) Filed: Sep. 30, 2016

(65) Prior Publication Data

US 2017/0303313 A1    Oct. 19, 2017

Related U.S. Application Data

(60) Provisional application No. 62/322,204, filed on Apr. 13, 2016.

(51) Int. Cl.
| | |
|---|---|
| *H04W 74/00* | (2009.01) |
| *H04W 84/12* | (2009.01) |
| *H04L 12/26* | (2006.01) |
| *H04L 5/00* | (2006.01) |
| *H04W 74/08* | (2009.01) |
| *H04B 17/336* | (2015.01) |
| *H04B 7/0413* | (2017.01) |

(52) U.S. Cl.
CPC ........ *H04W 74/085* (2013.01); *H04B 17/336* (2015.01); *H04L 43/16* (2013.01); *H04W 74/004* (2013.01); *H04W 74/006* (2013.01); *H04B 7/0413* (2013.01); *H04L 5/0007* (2013.01); *H04W 84/12* (2013.01)

(58) Field of Classification Search
CPC ..... H04B 17/336; H04B 7/0413; H04L 43/16; H04W 74/004; H04W 74/006; H04W 74/085

See application file for complete search history.

(56) References Cited

U.S. PATENT DOCUMENTS

| | | | | |
|---|---|---|---|---|
| 7,969,920 | B2 * | 6/2011 | Wentink | H04W 48/14 370/278 |
| 8,331,265 | B2 * | 12/2012 | Yong | H04B 7/0695 370/254 |
| 8,948,195 | B2 * | 2/2015 | Li | H04W 52/42 370/437 |
| 9,264,209 | B2 * | 2/2016 | Gong | H04L 5/14 |
| 9,661,659 | B2 * | 5/2017 | Choi | H04W 74/0816 |

(Continued)

*Primary Examiner* — Ahmed Elallam
(74) *Attorney, Agent, or Firm* — Schwegman Lundberg & Woessner, P.A.

(57) ABSTRACT

Computing readable media, apparatuses, and methods for spatial reuse with training in RTS-CTS are disclosed. An apparatus comprising processing circuitry is disclosed. The processing circuitry configured to: decode a received frame, the frame including either a request to send (RTS) frame or a clear to send (CTS) frame, with an initial portion of the frame indicating a plurality of training fields (TRN-R) at an end of the frame. The processing circuitry further configured to perform a clear channel assessment (CCA) for each receive (Rx) sector of a plurality of Rx sectors using the plurality of TRN-Rs.

22 Claims, 9 Drawing Sheets

(56) References Cited

U.S. PATENT DOCUMENTS

| | | | |
|---|---|---|---|
| 2005/0141459 A1* | 6/2005 | Li | H04B 7/0417 370/334 |
| 2006/0240780 A1* | 10/2006 | Zhu | H04W 74/0808 455/63.4 |
| 2011/0268037 A1* | 11/2011 | Fujimoto | H04B 7/043 370/328 |
| 2015/0244432 A1* | 8/2015 | Wang | H04B 7/0695 375/267 |
| 2015/0295629 A1* | 10/2015 | Xia | H04B 7/0491 370/329 |
| 2015/0333894 A1* | 11/2015 | Wang | H04L 5/0073 370/329 |
| 2016/0044711 A1* | 2/2016 | Lou | H04W 74/0816 370/338 |
| 2016/0087695 A1* | 3/2016 | Wang | H04B 7/0695 375/267 |
| 2016/0100427 A1* | 4/2016 | Nandagopalan | H04W 16/28 370/336 |
| 2016/0165630 A1* | 6/2016 | Oteri | H04W 74/04 370/336 |
| 2017/0127310 A1* | 5/2017 | Grandhi | H04W 4/06 |
| 2017/0134076 A1* | 5/2017 | Maamari | H04B 7/0452 |
| 2017/0195142 A1* | 7/2017 | Sanderovich | H04L 25/03006 |
| 2017/0279507 A1* | 9/2017 | Kim | H04B 17/327 |

* cited by examiner

SPATIAL REUSE WITH TRAINING IN RTS-CTS

PRIORITY CLAIM

This application claims the benefit of priority under 35 USC 119(e) to U.S. Provisional Patent Application Ser. No. 62/322,204, filed Apr. 13, 2016, which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ay. Some embodiments relate to Next Generation (NG) 60. Some embodiments relate to methods, computer readable media, and apparatus for spatial reuse with training field in request-to-send (RTS) and/or clear-to-send (CTS).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
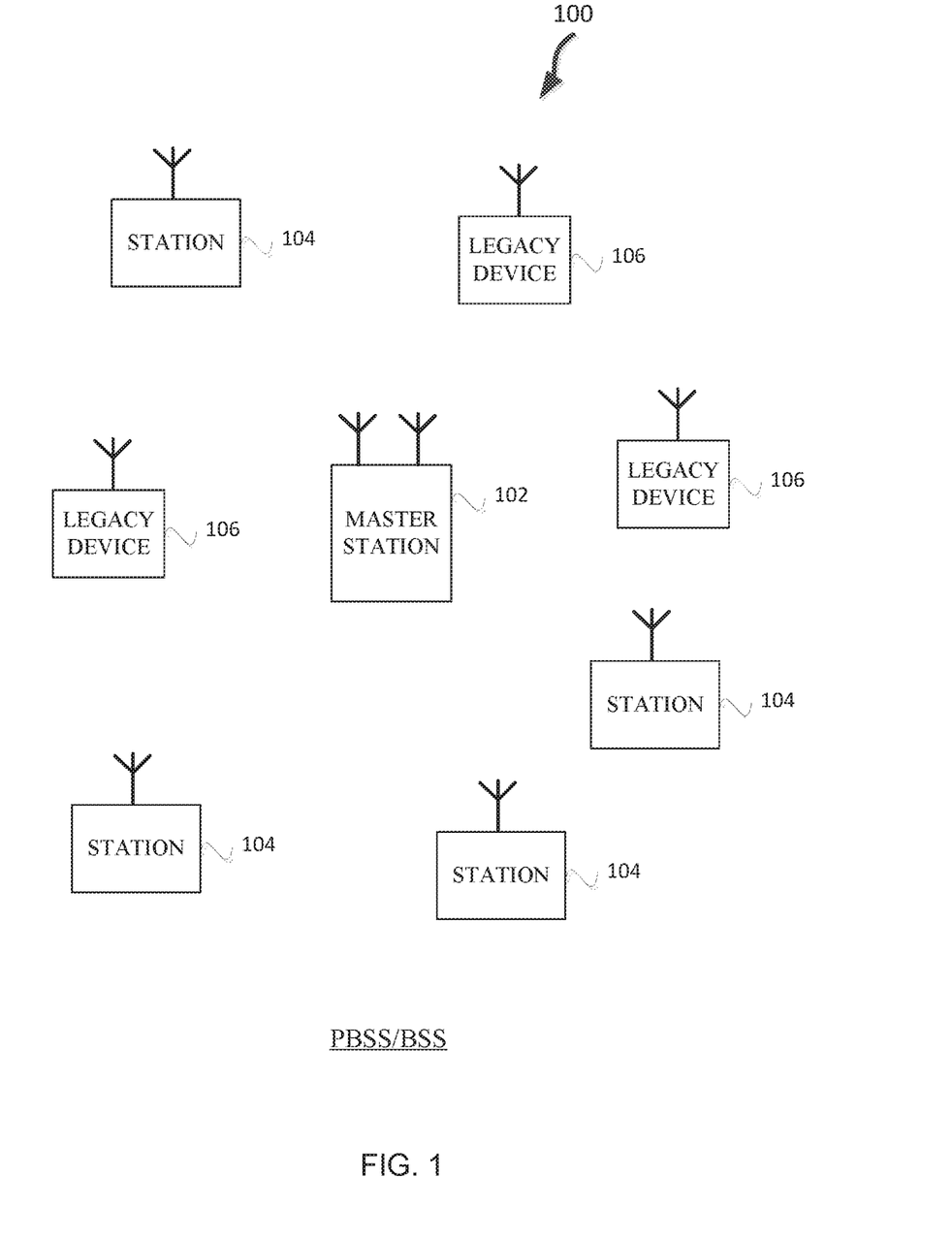
FIG. 1 illustrates a WLAN in accordance with some embodiments.

FIG. 1 illustrates a WLAN 100 in accordance with some embodiments. The WLAN may comprise a basis service set (BSS) or personal BSS (PBSS) 100 that may include a master station 102, which may be an AP or PBSS control point (PCP), a plurality of wireless (e.g., IEEE 802.11ay) STAs 104 and a plurality of legacy (e.g., IEEE 802.11n/ac/ad) devices 106.

The master station 102 may be an AP configured to transmit and receive in accordance with one or more IEEE 802.11 communication protocols, IEEE 802.11ax or IEEE 802.11ay. In some embodiments, the master station 102 is a base station. The master station 102 may be part of a PBSS. The master station 102 may use other communications protocols as well as the IEEE 802.11 protocol. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include code division multiple access (CDMA), space-division multiple access (SDMA), multiple-input multiple-output (MIMO), multi-user (MU) MIMO (MU-MIMO), and/or single-input single-output (SISO). The master station 102 and/or wireless STA 104 may be configured to operate in accordance with Next Generation 60 (NG60), WiFi Gigabyte (WiGiG), and/or IEEE 802.11ay.

The legacy devices 106 may operate in accordance with one or more of IEEE 802.11a/b/g/n/ac/ad/af/ah/aj, or another legacy wireless communication standard. The legacy devices 106 may be STAs or IEEE 802 STAs. The wireless STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ay or another wireless protocol. In some embodiments, the wireless STAs 104 may operate in accordance with IEEE 802.11ax. The STAs 104 and/or master station 102 may be attached to a BSS and may also operate in accordance with IEEE 802.11ay where one of the STAs 104 and/or master station 102 takes the role of the Priority Control Point (PCP).

The master station 102 may communicate with legacy devices 106 in accordance with legacy IEEE 802.11 communication techniques. In example embodiments, the master station 102 may also be configured to communicate with wireless STAs 104 in accordance with legacy IEEE 802.11 communication techniques. The master station 102 may use techniques of 802.11ad for communication with legacy device. The master station 102 and/or STA 104 may be a personal basic service set (PBSS) Control Point (PCP) which can be equipped with large aperture antenna array or Modular Antenna Array (MAA).

The master station 102 and/or STA 104 may be equipped with more than one antenna. Each of the antennas of master station 102 or STA 104 may be a phased array antenna with many elements. In some embodiments, an IEEE 802.11ay frame may be configurable to have the same bandwidth as a channel. In some embodiments, the master station 102 and/or STA 104 may be equipped with one or more directional multi-gigabyte (DMG) antennas, which may include multiple radio-frequency base band (RF-BB) chains. The master station 102 and/or STA 104 may be configured to perform beamforming and may have an antenna weight vector associated with one or more antennas. In some embodiments, the master station 102 and/or STA 104 may be a DMG master station 102 or DMG STA 104, respectively. In some embodiments, the master station 102 and/or STA 104 may be an enhanced DMG (EDMG) master station 102 or EDMG STA 104, respectively. In some embodiments, the master station 102 and/or STA 104 may transmit a frame, e.g., physical layer convergence protocol (PLCP) protocol data unit (PPDU)).

An IEEE 802.11ay frame may be configured for transmitting a number of spatial streams, which may be in accordance with MU-MIMO. In other embodiments, the master station 102, wireless STA 104, and/or legacy device 106 may also implement different technologies such as code division multiple access (CDMA) 2000, CDMA 2000 1×, CDMA 2000 Evolution-Data. Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In accordance with some IEEE 802.11ay embodiments, a master station 102 may operate as a master station which may be arranged to contend for a wireless medium (e.g., during a contention period) to receive exclusive control of the medium, which may be termed a transmission opportunity (TxOP) for performing beamforming training for a multiple access technique such as OFDMA or MU-MIMO. In some embodiments, the multiple-access technique used during a TxOP may be a scheduled OFDMA technique, although this is not a requirement. In some embodiments, the multiple access technique may be a space-division multiple access (SDMA) technique.

The master station 102 may communicate with legacy stations 106 and/or wireless stations 104 in accordance with legacy IEEE 802.11 communication techniques.

In example embodiments, the STA 104 and/or the master station 102 are configured to perform the methods and operations herein described in conjunction with FIGS. 1-10.

Figure 2:
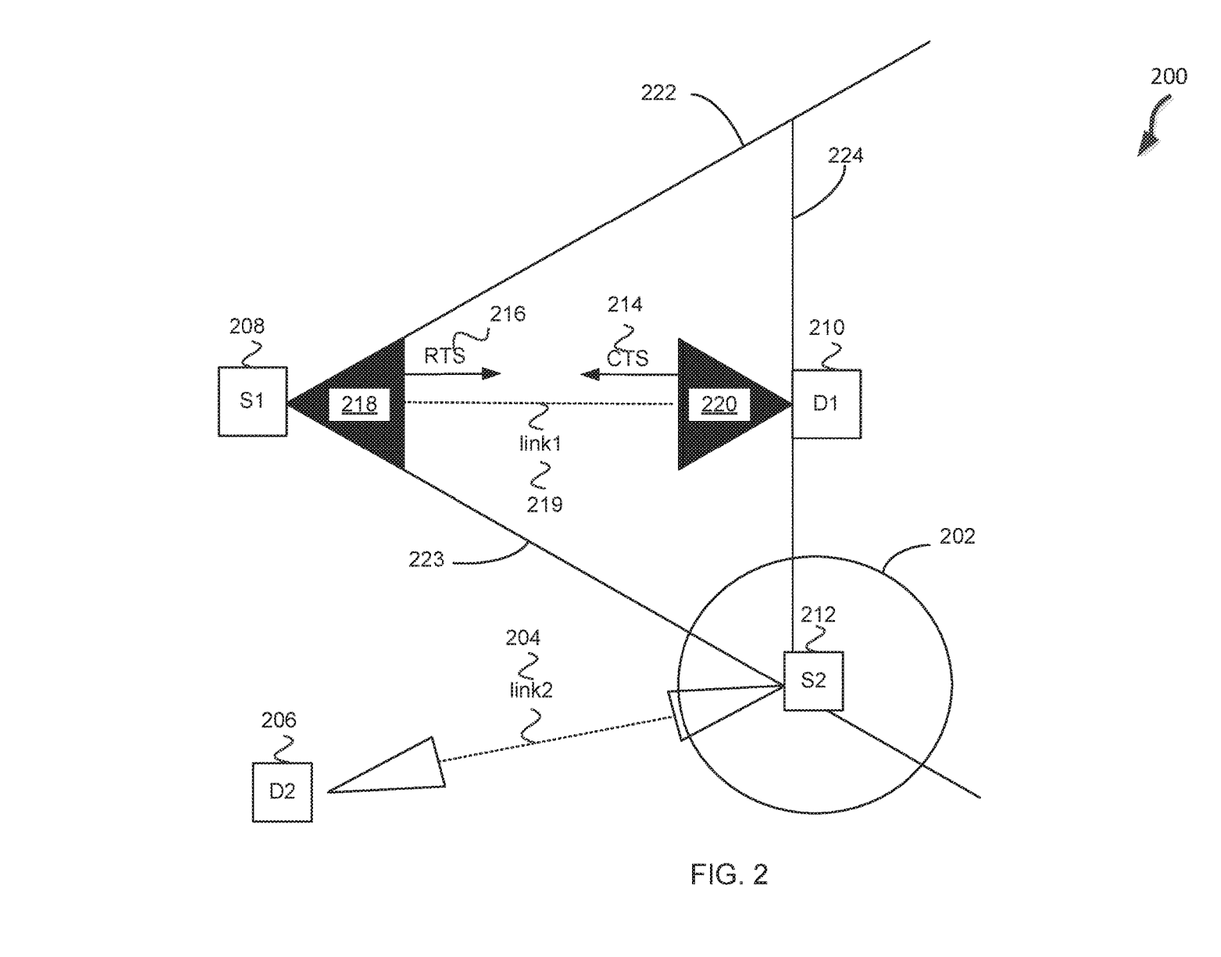
FIG. 2 illustrates a method of spatial reuse in accordance with some embodiments.

FIG. 2 illustrates a method of spatial reuse in accordance with some embodiments. Illustrated in FIG. 2 is a S1 208, S2 212, D1 210, D2 206, link 1 219, link 2 204, RTS 216, CTS 214, near signal power 218, near signal power 220, signal power line 222, signal power line 223, signal power low line 224, and clear channel assessment (CCA) area 202.

S1 208, S2 212, D1 210, D2 206 may each be a master station 102 or station 104. As illustrated, S1 208 is establishing a link1 219 with D1 210. S1 208 transmits a RTS 216, and D1 210 responds with a CTS 214. Near signal power 218 indicates high signal power near S1 208 from S1 208 transmitting RTS 216. Near signal power 220 indicates high signal power near D1 210 from D1 210 transmitting CTS 214. Signal power line 222 and signal power line 223 indicate the area from near signal power 218 where the signal power is still strong enough to be detected by a CCA of a master station 102 or a HE station 104. Signal power low line 224 indicates where the signal power becomes low from S1 208 transmitting RTS.

CCA 202 indicates an area where S2 212 detects signals as indicating the wireless medium is busy. As illustrated, S2 212 detects the RTS 216 transmitted by S1 208, so S2 212 does not transmit to D2 206 over link2 204. S1 208 and/or D1 210 may transmit the RTS 216 or CTS 214, respectively, by beamforming and transmitting in a direction way towards each other.

S2 212 may be able to transmit to D2 206 without interfering with link1 219 using spatial reuse, but the CCA 202 of S2 212 indicates the wireless medium is busy from the signal generated by S1 208 transmitting RTS 216 near the intersection of signal power line 222 and signal power line 223. S2 212 may be using omni receiver mode of the CCA.

Figure 3:
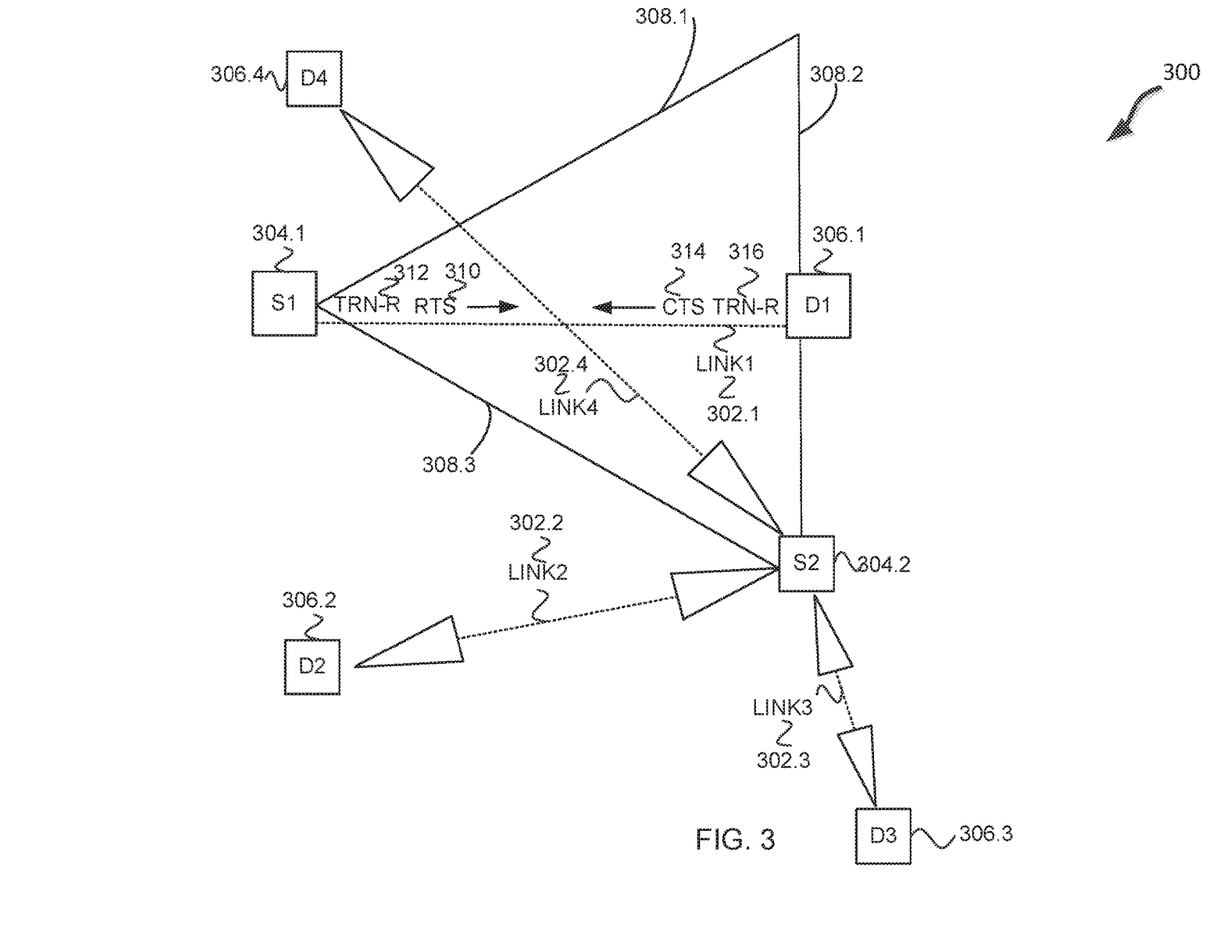
FIG. 3 illustrates a method of spatial reuse with training in RTS-CTS in accordance with some embodiments.

FIG. 3 illustrates a method 300 of spatial reuse with training in RTS-CTS in accordance with some embodiments. Illustrated in FIG. 2 is S1 304.1, S2 304.2, D1 306.1, D2 306.2, D3 306.3, D4 306.4, link 1 302.1, link2 302.2, link3 302.3, link4 302.4, signal power line 308.1, signal power line 308.2, signal power low line 308.3, RTS 316, N receiver training fields (TRN-R) 312, CTS 314, TRN-R 316.

S1 304.1, S2 304.2 may each be a master station 102 or a station 104. D1 306.1, D2 306.2, D3 306.3, D4 306.4 may each be a master station 102, a station 104, or a legacy device 106.

Link1 302.1 indicates the communication link between S1 304.1 and D1 306.1. Link2 302.2 indicates communication between S2 304.2 and D2 306.2. Link3 302.3 indicates communication between S2 304.2 and D3 306.3. Link4 302.4 indicates communication between S2 304.2 and D4 306.4.

Signal power line 308.1, signal power line 308.2, signal power low line 308.3, outline an area where the signal strength from transmissions (e.g., RTS 310) from S1 304.1 to D1 306.1 are strong enough that a CCA by S2 304.2 would indicate that the wireless medium is busy. In example embodiments, the station 104 or master station 102 may perform CCA by determining the channel is busy if a packet detect energy level is above a threshold (e.g., −68 dBm) for a predetermined amount of time.

Figure 6:
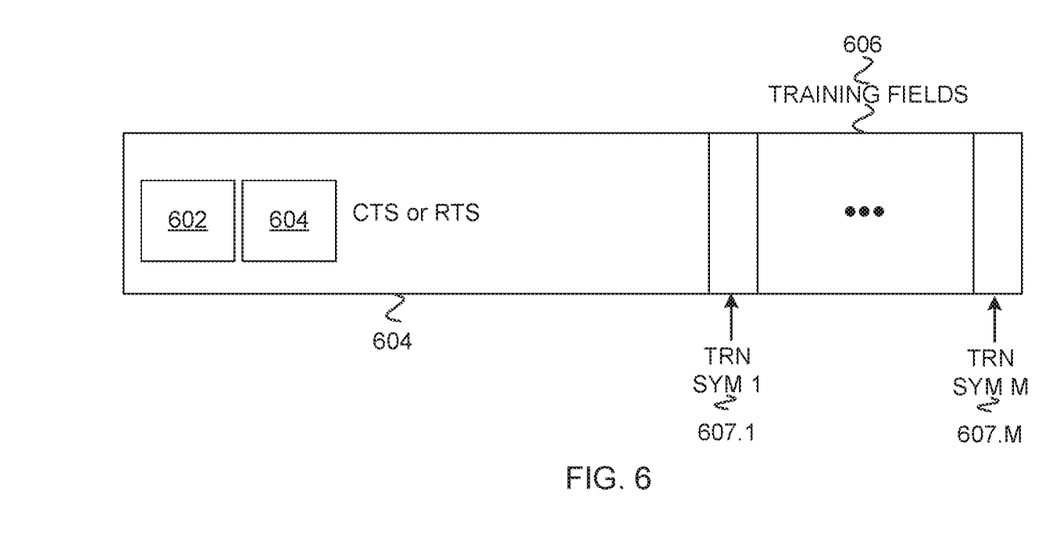
FIG. 6 illustrates a CTS or RTS in accordance with some embodiments.

The RTS 310 may be a CTS or RTS 604 as disclosed in conjunction with FIG. 6. The CTS 314 may be a CTS or RTS 604 as disclosed in conjunction with FIG. 6. The TRN-R 312 may be training fields 606 as disclosed in conjunction with FIG. 6. The TRN-R 316 may be training fields 606 as disclosed in conjunction with FIG. 6. S1 304.1 and D1 306.1 may transmit using beamforming, S1 304.1 and D1 306.1 may transmit in a directional way.

Figure 4:
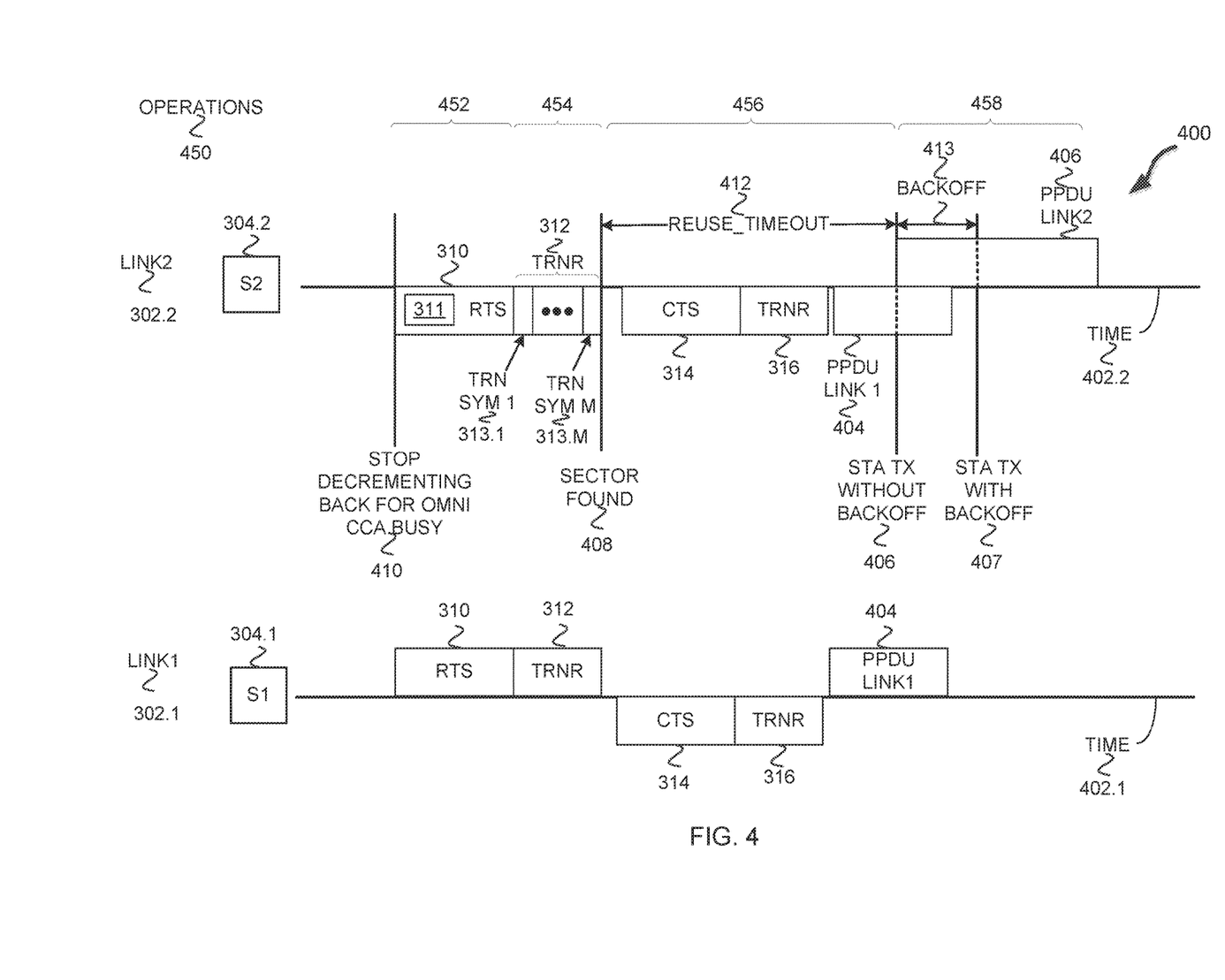
FIG. 4 illustrates a method of spatial reuse with training in RTS-CTS in accordance with some embodiments.

FIG. 4 illustrates a method 400 of spatial reuse with training in RTS-CTS in accordance with some embodiments. FIG. 4 will be disclosed in conjunction with FIG. 3. Illustrated in FIG. 4 is time 402 along a horizontal axis. Operations 450 are along the top. Link1 302.1 may be the same as the link1 302.1 in FIG. 3. S1 304.1 may be the same or similar as S1 304.1 in FIG. 3. Link2 302.2 may be the same or similar as link2 302.2 in FIG. 3. S2 304.2 may be the same or similar as S2 304.2 in FIG. 3.

The method 400 begins with operation 452 with S2 304.2 receiving RTS 310. A packet above the time 402.2 line indicates S2 304.2 transmitted the packet, and a packet below the time 402.2 line indicates S2 304.2 received the packet. A packet above the time 402.1 line indicates S1 304.1 transmitted the packet, and a packet below the time 402.1 line indicates S1 304.1 received the packet.

S1 304.1 transmits RTS 310 and S2 304.2 receives RTS 310. For example, the signal strength for RTS 310 may be strong enough within the signal power lines 308 for S2 304.2 to detect and receive RTS 310. The RTS 310 may include a duration 311 that indicates a duration other stations 104 or master stations 102 that are not addressed by the RTS 310 should set their NAVs. In some embodiments, the RTS 310 includes an TRNR indication. For example, RTS 310 may include TRNR indication 602 in some embodiments, S2 304.2 may be performing CCA using omni direction during or before operation 452. In FIG. 3, S2 304.2 may receive RTS 310. S2 304.2 may before and/or during the reception of RTS 310 be in omni-Rx mode so it can receive physical (PHY) layer convergence procedure (PLCP) protocol data units (PPDUs) from other stations 104 or master stations 102 in any direction. S2 304.2 may be in omni-Rx mode so that it can sense the wireless medium before accessing a channel and transmitting. S2 304.2 may determine that the CCA is determined to be busy based on the RTS 310 and may set a NAV of S2 304.2 based on a duration 311 of the RTS 310.

The method 400 continues at operation 454 with S2 304.2 receiving TRNR 312. For example, S2 304.2 may receive TRNR 312 transmitted by S1 304.1. In some embodiments, the TRNR 312 includes M training symbols, e.g., TRN SYM 1 313.1 through TRN SYM M 313.M, which may be null data packets (NDPs). In some embodiments, the number M may vary based on previous communications of S1 304.1. S2 304.2 may sense the wireless medium for a plurality of receive (Rx) sectors (e.g., sectors 504 of FIG. 8) using the TRN SYMs 313 at the end of the CTS or RTS. In some embodiments. S2 304.2 checks if the CCA is busy or a different operation than CCA (e.g., SNR) to determine whether or not S2 304.2 may transmit using beamforming or in a directional way in an Rx sector, e.g. if the SNR is below a threshold the station may refrain from transmitting on the Rx sector in a directional way or using beamforming. In some embodiments, S2 304.2 may select one or more of the Rx sectors to determine whether S2 304.2 may spatially reuse the Rx sector. In some embodiments, S2 304.2 may select one or more of the Rx sectors to sense the wireless medium to determine whether S2 304.2 may transmit in a directional way or using beamforming in an Rx sector without interfering with the transmission of S1 304.1 with one or more wireless devices, e.g. as illustrated link1 302.1, which is between S1 304.1 and D1 306.1. In some embodiments, S2 304.2 selects the Rx sectors to sense or train based on candidate links, e.g., link2 302.2, link3 302.3, and link4 302.4). In some embodiments, S2 304.2 may train any of the Rx sectors (e.g., sectors 504) using the TRN SYMs 313.

As illustrated in FIG. 3, S2 304.2 may sense the wireless medium for three Rx sectors corresponding to Link2 302.2, Link3 302.3, and Link4 302.4. S2 304.2 may sense the three Rx sectors during one or more of the TRN SYMs 313.

In some embodiments, S2 304.2 associates a CCA busy or idle to each of the Rx sectors that it trained or sensed and stores the information. For example, Table 1 illustrates S2 304.2 training using TRN SYMs 313.

TABLE 1

Results of S2 304.2 Training

| Sectors | CCA | NAV |
| --- | --- | --- |
| omni | Busy | Set by S1 304.1 (e.g., duration 311 of RTS) |
| Toward D2 306.2 (link2 302.2) | Idle | 0 |
| Toward D3 306.3 (link3 302.3) | Idle | 0 |
| Toward D4 306.4 (link4 302.4) | Busy | Set by S1 304.1 (e.g., duration 311 of RTS) |

In some embodiments, if an Rx sector is determined to be idle, then the NAV associated with the Rx sector is set to a previous NAV associated with the Rx sector. In some embodiments, if an Rx sector is determined to be idle, then the NAV associated with the Rx sector is set to a previous NAV associated with the Rx sector or a NAV associated with the omni sectors.

In some embodiments, if an Rx sector is determined to have a CCA busy, then the NAV associated with the Rx sector may be set by the duration 311 of the RTS. In some embodiments, if an Rx sector is determined to have a CCA busy, then the NAV associated with the Rx sector may be set by the greater of the duration of the duration 311 indicated in the RTS 310 and a previous NAV associated with the Rx sector.

The method 400 continues at operation 456 with S2 304.2 waiting a reuse timeout 412. D1 306.1 transmits CTS 314 and TRNR 316 to S1 304.1, where the transmitting may be in a directional way or using beamforming. S2 304.2 may perform the same or similar training as described in conjunction with operation 454 using TRNR 316.

In some embodiments, if after reuse timeout no energy is detected (which may be based on detecting energy in a direction of the intended transmission, e.g. for an Rx sector) by S2 304.2 from a direction of link1 302.1 (not detecting CTS 314 does not mean that it was not transmitted), S2 304.2 may have Rx sectors that have CCA idle and NAV equal to zero (e.g., Table 1). S2 304.2 may then transmit on the Rx sectors after reuse timeout. Reuse timeout may be a duration waiting time before allowing the reuse link, e.g., D2 306.2, to access the channel or to start a back-off timer. Reuse timeout may be CTS 314 timeout after the end of the RTS 310, or may be longer. In some embodiments, reuse timeout may extend until S1 304.1 would transmit at least a portion of PPDU link1 404.

The method 400 continues at operation 458 with S2 304.2 transmitting PPDU link2 406, In some embodiments, S2 304.2 transmit PPDU link2 406 at time STA TX without backoff 406, which may be after reuse timeout 412. In some embodiments, S2 304.2 may perform a backoff listening to the intended direction before transmitting PPDU link2 406 at STA TX with backoff 407. S2 304.2 may transmit using beamforming or in a directional way.

Referring again to FIG. 3, S2 304.2 may transmit PPDU link2 406 to D2 306.2. D2 306.2 may determine that it is unable to transmit (e.g., D2 306.2 may perform the same procedures as S2 304.2 and transmissions from D1 306.1 or another transmitter may indicate that D2 306.2 should not transmit) and respond with a DTS to a RTS (e.g., PPDU link2 406) from S2 304.2. S2 304.2 as illustrated in Table 1 may also be able to transmit toward D3 306.3.

Figure 5:
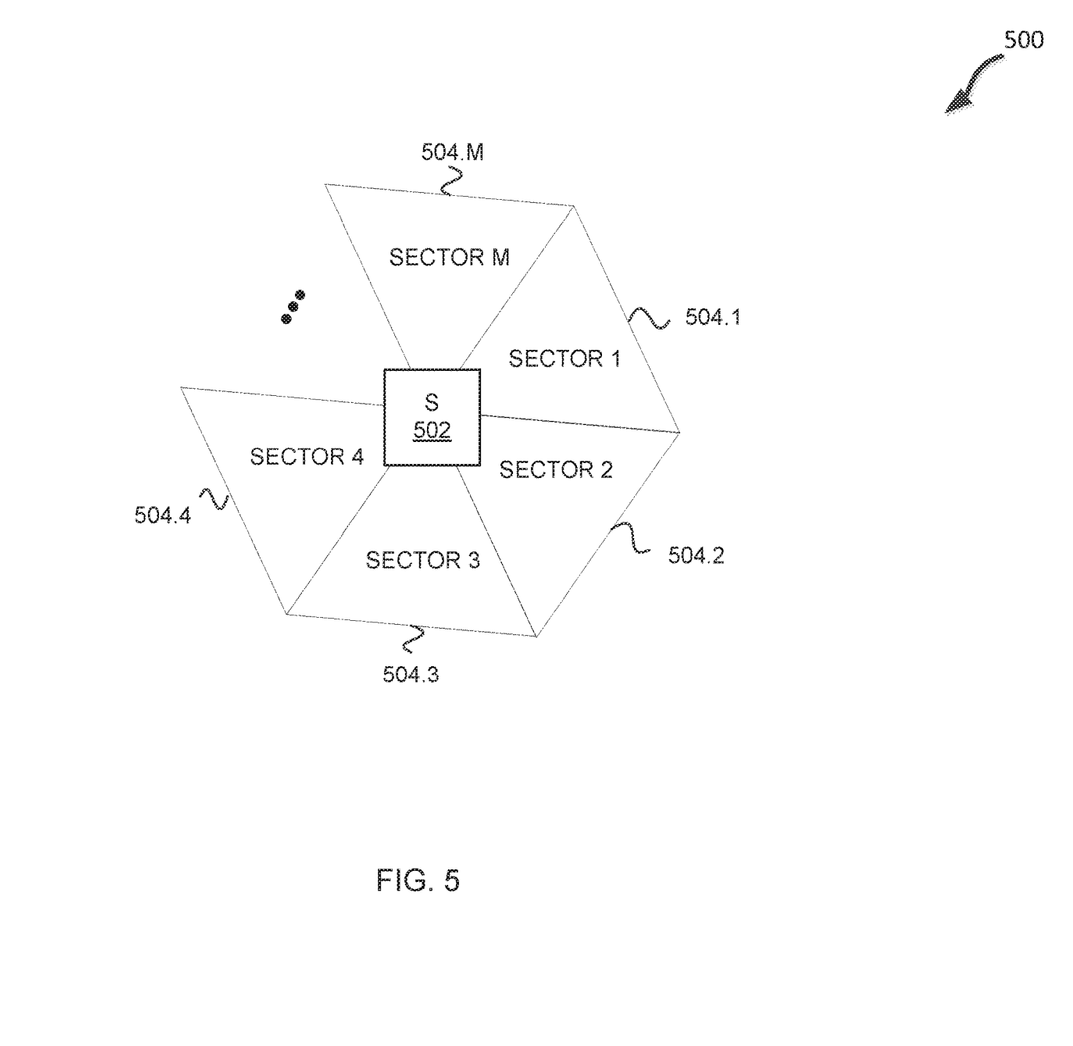
FIG. 5 illustrates receive sectors of S in accordance with some embodiments.

FIG. 5 illustrates receive sectors of S 502 in accordance with some embodiments. Illustrated in FIG. 5 is S 502 and sectors 504. S 502 may be a station 104 or master station 102. Sectors 504 may be receive sectors that S 502 may perform operations such as CCA, SNR, etc. The sectors 504 may overlap. S 502 may be able to dynamically determine the sectors 504. There may be M sectors 504. The sectors M may be three dimensional where as they are illustrated as two dimensional. For example, a sector 504 may be at a 90 degree angel with the FIG. 5.

FIG. 6 illustrates a CTS or RTS 604 in accordance with some embodiments. In some embodiments, the CTS or RTS 604 may include a TRNR indication 602 and/or a duration 604. The TRNR indication 602 may indicate whether or not training fields 606 are going to be transmitted. The duration 604 may indicate a duration that wireless devices that are not addressed by a RTS should set their NAV to deter from transmitting. The training fields 606 may be part of the CTS or RTS 604 or may be transmitted after the CTS or RTS 604. The training fields 606 may be training (TRN) symbol (sym)

1 607.1 through TRN sym M 607.*m*. The TRN symbols 607 may be NDPs. In some embodiments, the duration of the TRN symbols 607 is variable.

Figure 7:
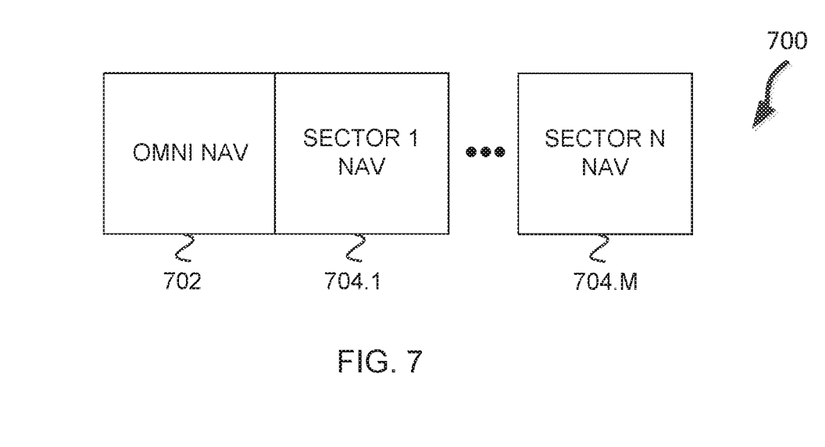
FIG. 7 illustrates NAVs for a station or master station in accordance with some embodiments.

FIG. 7 illustrates NAVs 700 for a station 104 or master station 102 in accordance with some embodiments. Illustrated in FIG. 7 is omni NAV 702, sector 1 NAV 704.1 through sector N NAV 704.N. The omni NAV 702 may be for omni sensing the wireless medium. Each of the sector 1 NAV 704 may be for sensing the wireless medium in a direction way in accordance with the corresponding sector of the sector NAV 704. The station 104 or master station 104 may be configured to maintain a table of the NAVs or another data structure.

Figure 8:
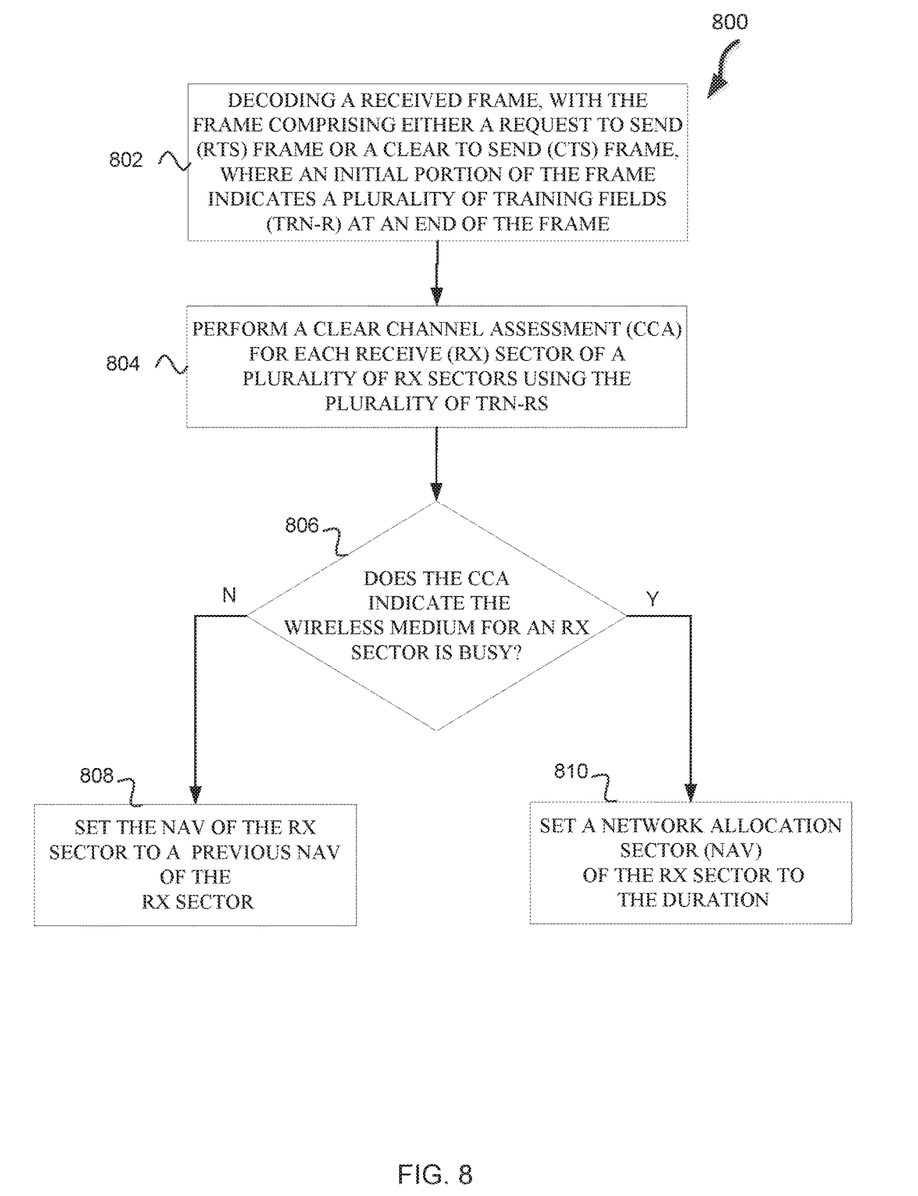
FIG. 8 illustrates a method for spatial reuse with training in RTS-CTS in accordance with some embodiments.

FIG. 8 illustrates a method 800 for spatial reuse with training in RTS-CTS in accordance with some embodiments. The method 800 may begin at operation 802 with decoding a received frame, with the frame comprising either a request to send (RTS) frame or a clear to send (CTS) frame, where an initial portion of the frame indicates a plurality of training fields (TRN-R) at an end of the frame. For example, S2 304.2 (FIGS. 3 and 4) may decode RTS 310 with TRNRs 312 or CTS 314 with TRNRs 316.

The method 800 continues at operation 804 with performing a clear channel assessment (CCA) for each receive (Rx) sector of a plurality of Rx sectors using the plurality of TRN-Rs. For example, S2 304.2 (FIGS. 3 and 4) may perform a CCA for Rx sectors corresponding to (D2 306.2, D3 306.3, and D4 305.4), or sectors 504.

The method 800 continues at operation 806 with does the CCA indicate the wireless medium for an Rx sector is busy? For example, S2 304.2 (FIGS. 3 and 4) may evaluate an Rx sector corresponding to D2 306.2, D3 306.3, and D4 305.4. As disclosed in conjunction with FIGS. 3 and 4, for the Rx sector corresponding to D2 306.2, S2 304.2 may determine a CCA is idle. For the Rx sector corresponding to D3 306.3, S2 304.2 may determine a CCA is idle. For the Rx sector D4 306.4, S2 304.2 may determine a CCA is busy.

If the CCA indicates the wireless medium for an Rx sector is not busy, but idle, the method 800 continues at operation 808 with setting the NAV of the Rx sector to a previous NAV of the Rx sector. For example, S2 304.2 may set a NAV associated with an Rx sector corresponding to D2 306.2 to zero (see Table 1), which may be the value of a previous NAV of the Rx sector before operations 802 and 804.

If the CCA indicates the wireless medium for an Rx sector is busy, the method 800 continues at operation 810 with setting the NAV of the Rx sector to the duration. For example, S2 304.2 may set a NAV associated with an Rx sector corresponding to D4 306.4 to the duration of the RTS or CTS (see Table 1). In some embodiments, the NAV of the Rx sector may be set to the maximum of the duration and a previous NAV of the Rx sector. The method 800 may perform operation 806 for each Rx sector that is trained with a TRN-R of the RTS or CTS.

Figure 9:
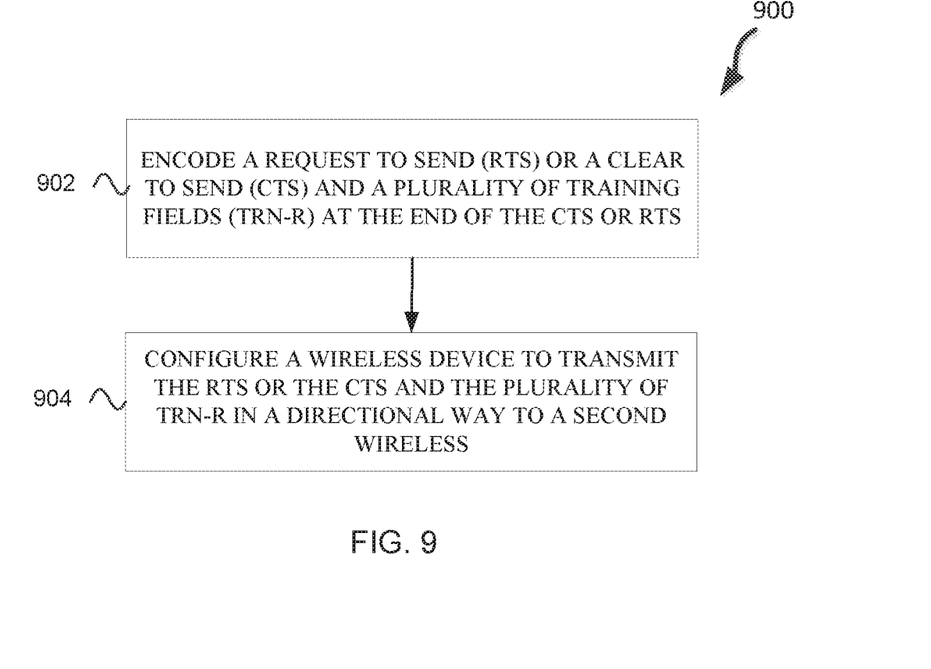
FIG. 9 illustrates a method for spatial reuse with training in RTS-CTS in accordance with some embodiments.

FIG. 9 illustrates a method 900 for spatial reuse with training in RTS-CTS in accordance with some embodiments. The method 900 begins with operation encode a request to send (RTS) or a clear to send (CTS) and a plurality of training fields (TRN-R) at the end of the CTS or RTS. For example, S1 304.1 of FIGS. 3 and 4 may encode RTS 310 with TRNRs 312. As another example, D1 306.1 may encode CTS 314 with TRNRs 316. As yet another example, a station 104 or master station 102 may encode CTS or RTS 604 with training fields 606.

The method 900 continues at operation 904 with configuring a wireless device to transmit the RTS or the CTS and the plurality of TRN-R in a directional way to a second wireless. For example, an apparatus of S1 304.1 may configure S1 304.1 to transmit RTS 310 and TRNRs 312. As another example, an apparatus of D1 306.1 may configure D1 306.1 to transmit CTS 314 with TRNRs 316. The method 900 may end.

Figure 10:
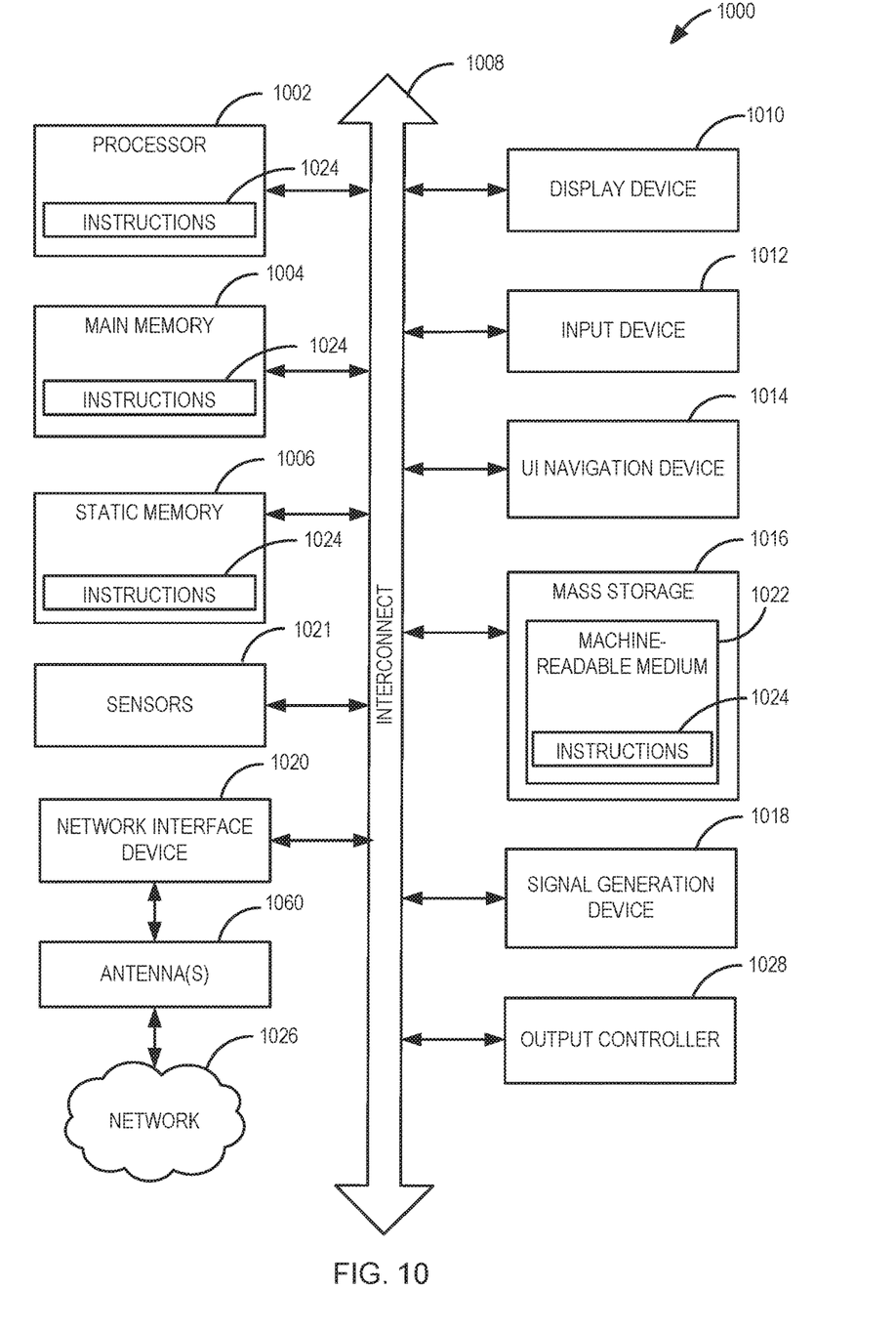
FIG. 10 illustrates a block diagram of an example machine upon which any one or more of the techniques (e.g., methodologies) discussed herein may perform.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a master station 102, HE station 104, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008.

Specific examples of main memory 1004 include Random Access Memory (RAM), and semiconductor memory devices, which may include, in some embodiments, storage locations in semiconductors such as registers. Specific examples of static memory 1006 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1000 may further include a display device 1010, an input device 1012 (e.g., a keyboard), and a user interface (UI) navigation device 1014 (e.g., a mouse). In an example, the display device 1010, input device 1012 and UI navigation device 1014 may be a touch screen display. The machine 1000 may additionally include a mass storage (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a minter, card reader, etc.). In some embodiments the processor 1002 and/or instructions 1024 may comprise processing circuitry and/or transceiver circuitry.

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1022 is illustrated as a single medium, the term "machine readable medium" may include a single medium or multiple media (e.g., a centralized or distributed database, and/or associated caches and servers) configured to store the one or more instructions 1024.

An apparatus of the machine 1000 may be one or more of a hardware processor 1002 (e.g., a central processing unit (CPU), a graphics processing unit (GPU), a hardware processor core, or any combination thereof), a main memory 1004 and a static memory 1006, sensors 1021, network interface device 1020, antennas 1060, a display device 1010, an input device 1012, a UI navigation device 1014, a mass storage 1016, instructions 1024, a signal generation device 1018, and an output controller 1028. The apparatus may be configured to perform one or more of the methods and/or operations disclosed herein. The apparatus may be intended as a component of the machine 1000 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1020 may include one or more physical jacks (e.g., Ethernet, coaxial, or phone jacks) or one or more antennas to connect to the communications network 1026. In an example, the network interface device 1020 may include one or more antennas 1060 to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques. The term "transmission medium" shall be taken to include any intangible medium that is capable of storing, encoding or carrying instructions for execution by the machine 1000, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Example 1 is an apparatus of a wireless device, the apparatus including: memory; and processing circuitry coupled to the memory, the processing circuitry configured to: decode a received frame, the frame including either a request to send (RTS) frame or a clear to send (CTS) frame, an initial portion of the frame indicating a plurality of training fields (TRN-R) at an end of the frame; and perform a clear channel assessment (CCA) for each receive (Rx) sector of a plurality of Rx sectors using the plurality of TRN-Rs.

In Example 2, the subject matter of Example 1 optionally includes where the frame comprises an indication of a duration for the wireless device to defer from accessing a wireless medium, and where the processing circuitry is further configured to: if the CCA indicates the wireless medium for an Rx sector of the plurality is busy, set a network allocation vector (NAV) of the Rx sector to the duration.

In Example 3, the subject matter of Example 2 optionally includes where the processing circuitry is further configured to: if the CCA indicates the wireless medium for the Rx sector of the plurality is idle, set the NAV of the Rx sector to a previous NAV of the Rx sector.

In Example 4, the subject matter of Example 3 optionally includes where the previous NAV is a value of the NAV for the Rx sector before the CCA is performed for the Rx sector.

In Example 5, the subject matter of any one or more of Examples 1-4 optionally include where the processing circuitry is further configured to: determine a signal to noise ratio (SNR) for each of the plurality of Rx sectors; and if the SNR ratio is below a threshold for an Rx sector of the plurality, refrain from transmitting in a directional way on the Rx sector.

In Example 6, the subject matter of any one or more of Examples 1-5 optionally include where the processing circuitry is further configured to: switch from an omni-receive mode for the CCA and perform the CCA for the plurality of Rx sectors using a directional CCA for each of the TRN-Rs at the end of the frame.

In Example 7, the subject matter of any one or more of Examples 1-6 optionally include where when the received frame is an RTS frame, the RTS frame is not addressed to the wireless device.

In Example 8, the subject matter of any one or more of Examples 1-7 optionally include where when the received frame is an RTS frame, the processing circuitry is further configured to: if the RTS frame is not addressed to the wireless device, set a network allocation vector (NAV) as busy based on a duration in the RTS frame, and if the wireless device is counting down to access the wireless medium, stop counting down.

In Example 9, the subject matter of any one or more of Examples 1-8 optionally include where the processing circuitry is further configured to: if the CCA indicates that one Rx sector of the Rx sectors is idle and a CCA for the one Rx sector indicates the one Rx sector is idle for a CTS-timeout duration, encode a packet for transmission; and configure the wireless device to transmit the encoded packet in a directional way in the one Rx sector.

In Example 10, the subject matter of Example 9 optionally includes where the processing circuitry is further configured to: if the CCA indicates that one Rx sector of the Rx sectors is idle and a CCA for the one Rx sector indicates the Rx sector is idle for a reuse timeout period, encode a packet for transmission, where the reuse timeout period is at least as large as the CTS-timeout duration; and configure the wireless device to transmit the encoded packet in a directional way in the one Rx sector.

In Example 11, the subject matter of any one or more of Examples 9-10 optionally include where the processing circuitry is further configured to: configure the wireless device to transmit the packet in a directional way in the one Rx sector in accordance with at least one of orthogonal frequency division multiple-access (OFDMA) and multi-user multiple-input multiple-output (MU-MIMO).

In Example 12, the subject matter of Example 11 optionally includes where when the received frame is an RTS frame, the RTS frame is received from a second wireless device and the reuse timeout period is at least a duration to enable the second wireless device to receive the CTS frame and to begin transmitting a physical (PHY) layer convergence procedure (PLCP) protocol data units (PPDU).

In Example 13, the subject matter of any one or more of Examples 11-12 optionally include where the processing circuitry is further configured to: decode the frame and stop a backoff countdown if the wireless device was performing the backoff countdown; continue the backoff countdown; and configure the wireless device to transmit in the directional way in the one Rx sector if the backoff countdown equals to zero.

In Example 14, the subject matter of any one or more of Examples 1-13 optionally include where the wireless device and the one or more stations are each one from the following group: an Institute of Electrical and Electronic Engineers (IEEE) 802.11ay access point, an IEEE 802.11ay station, Electronic Engineers (IEEE) 802.11 next generation (NG) 60 access point, an IEEE 802.11 NG60 station, an IEEE 802.11 station, and an IEEE 802.11 access point.

In Example 15, the subject matter of any one or more of Examples 1-14 optionally include where the received frame was the RTS frame, and where the processing circuitry is further configured to: decode a received CTS frame, where a second initial portion of the CTS frame indicates a second plurality of TRN-R at an end of the CTS frame; and perform a second CCA for each Rx sector of the plurality of Rx sectors using the second plurality of TRN-Rs.

In Example 16, the subject matter of any one or more of Examples 1-15 optionally include transceiver circuitry coupled to the processing circuitry.

In Example 17, the subject matter of Example 16 optionally includes one or more antennas coupled to the transceiver circuitry.

Example 18 is a non-transitory computer-readable storage medium that stores instructions for execution by one or more processors, the instructions to configure the one or more processors to cause an apparatus of a wireless device to: decode a received frame, the frame including either a request to send (RTS) frame or a clear to send (CTS) frame, an initial portion of the frame indicating a plurality of training fields (TRN-R) at an end of the frame; and perform a clear channel assessment (CCA) for each receive (Rx) sector of a plurality of Rx sectors using the plurality of TRN-Rs.

In Example 19, the subject matter of Example 18 optionally includes where the instructions further configure the one or more processors to cause the apparatus to: if the CCA indicates the wireless medium for an Rx sector of the plurality is busy, set a network allocation vector (NAV) of the Rx sector to the duration, where the frame comprises an indication of the duration for the wireless device to defer from accessing a wireless medium.

In Example 20, the subject matter of any one or more of Examples 18-19 optionally include where the instructions further configure the one or more processors to cause the apparatus to: if the CCA indicates the wireless medium for the Rx sector of the plurality is idle, set the NAV of the Rx sector to a previous NAV of the Rx sector.

Example 21 is a method performed by a wireless device, the method including: decoding a received frame, the frame including either a request to send (RTS) frame or a clear to send (CTS) frame, an initial portion of the frame indicating a plurality of training fields (TRN-R) at an end of the frame; and performing a clear channel assessment (CCA) for each receive (Rx) sector of a plurality of Rx sectors using the plurality of TRN-Rs.

In Example 22, the subject matter of Example 21 optionally includes the method further including: if the CCA indicates that one Rx sector of the Rx sectors is idle and a CCA for the one Rx sector indicates the one Rx sector is idle for a CTS-timeout duration, encoding a packet for transmission; and configuring the wireless device to transmit the encoded packet in a directional way in the one Rx sector.

Example 23 is an apparatus including memory; and processing circuitry coupled to the memory, the processing circuitry configured to: encode a request to send (RTS) or a clear to send (CTS) and a plurality of training fields (TRN-R) at the end of the CTS or RTS; and configure a wireless device to transmit the RTS or the CTS and the plurality of TRN-R in a directional way to a second wireless.

In Example 24, the subject matter of any one or more of Examples 22-23 optionally include where the processing circuitry is further configured to: encode an indication field in the RTS or the CTS that indicates that the plurality of TRN-R are to be transmitted after the RTS or the CTS.

In Example 25, the subject matter of Example 24 optionally includes transceiver circuitry coupled to the processing circuitry; and, one or more antennas coupled to the transceiver circuitry.

Example 26 is an apparatus of a wireless device, the apparatus including: means for decoding a received frame, the frame including either a request to send (RTS) frame or a clear to send (CTS) frame, an initial portion of the frame indicating a plurality of training fields (TRN-R) at an end of the frame; and means for performing a clear channel assessment (CCA) for each receive (Rx) sector of a plurality of Rx sectors using the plurality of TRN-Rs.

In Example 27, the subject matter of Example 26 optionally includes where the frame comprises an indication of a duration for the wireless device to defer from accessing a wireless medium, and where the apparatus further comprises: if the CCA indicates the wireless medium for an Rx sector of the plurality is busy, means for setting a network allocation vector (NAV) of the Rx sector to the duration.

In Example 28, the subject matter of Example 27 optionally includes the apparatus further including: if the CCA indicates the wireless medium for the Rx sector of the plurality is idle, means for setting the NAV of the Rx sector to a previous NAV of the Rx sector.

In Example 29, the subject matter of Example 28 optionally includes where the previous NAV is a value of the NAV for the Rx sector before the CCA is performed for the Rx sector.

In Example 30, the subject matter of any one or more of Examples 26-29 optionally include the apparatus further including: determine a signal to noise ratio (SNR) for each of the plurality of Rx sectors; and if the SNR ratio is below a threshold for an Rx sector of the plurality, means for refraining from transmitting in a directional way on the Rx sector.

In Example 31, the subject matter of any one or more of Examples 26-30 optionally include the apparatus further including: means for switching from an omni-receive mode for the CCA and perform the CCA for the plurality of Rx sectors using a directional CCA for each of the TRN-Rs at the end of the frame.

In Example 32, the subject matter of any one or more of Examples 26-31 optionally include where when the received frame is an RTS frame, the RTS frame is not addressed to the wireless device.

In Example 33, the subject matter of any one or more of Examples 26-32 optionally include the apparatus further including: means for setting a network allocation vector (NAV) as busy based on a duration in the RTS frame, if the received frame is an RTS frame and if the RTS frame is not addressed to the wireless device, and means for stopping to count down if the wireless device is counting down to access the wireless medium.

In Example 34, the subject matter of any one or more of Examples 26-33 optionally include the apparatus further including: if the CCA indicates that one Rx sector of the Rx sectors is idle and a CCA for the one Rx sector indicates the one Rx sector is idle for a CTS-timeout duration, means for encoding a packet for transmission; and means for configuring the wireless device to transmit the encoded packet in a directional way in the one Rx sector.

In Example 35, the subject matter of Example 34 optionally includes where the processing circuitry is further configured to: if the CCA indicates that one Rx sector of the Rx sectors is idle and a CCA for the one Rx sector indicates the Rx sector is idle for a reuse timeout period, encode a packet for transmission, where the reuse timeout period is at least as large as the CTS-timeout duration; and configure the wireless device to transmit the encoded packet in a directional way in the one Rx sector.

In Example 36, the subject matter of any one or more of Examples 34-35 optionally include the apparatus further including: means for configuring the wireless device to transmit the packet in a directional way in the one Rx sector in accordance with at least one of orthogonal frequency division multiple-access (OFDMA) and multi-user multiple-input multiple-output (MU-MIMO).

In Example 37, the subject matter of Example 36 optionally includes where when the received frame is an RTS frame, the RTS frame is received from a second wireless device and the reuse timeout period is at least a duration to enable the second wireless device to receive the CTS frame and to begin transmitting a physical (PHY) layer convergence procedure (PLCP) protocol data units (PPDU).

In Example 38, the subject matter of any one or more of Examples 36-37 optionally include the apparatus further including: means for decoding the frame and stop a backoff countdown if the wireless device was performing the backoff countdown; means for continuing the backoff countdown; and means for configuring the wireless device to transmit in the directional way in the one Rx sector if the backoff countdown equals to zero.

In Example 39, the subject matter of any one or more of Examples 26-38 optionally include where the wireless device and the one or more stations are each one from the following group: an Institute of Electrical and Electronic Engineers (IEEE) 802.11ay access point, an IEEE 802.11ay station, Electronic Engineers (IEEE) 802.11 next generation (NG) 60 access point, an IEEE 802.11 NG60 station, an IEEE 802.11 station, and an IEEE 802.11 access point.

In Example 40, the subject matter of any one or more of Examples 26-39 optionally include the apparatus further including: if the received frame was the RTS frame, means for decoding a received CTS frame, where a second initial portion of the CTS frame indicates a second plurality of TRN-R at an end of the CTS frame; and if the received frame was the RTS frame, means for performing a second CCA for each Rx sector of the plurality of Rx sectors using the second plurality of TRN-Rs.

In Example 41, the subject matter of any one or more of Examples 26-40 optionally include the apparatus further including means for processing radio signals.

In Example 42, the subject matter of Example 41 optionally includes the apparatus further including means for transmitting and receiving radio signals.

Example 43 is a non-transitory computer-readable storage medium that stores instructions for execution by one or more processors, the instructions to configure the one or more processors to cause an apparatus of a wireless device to: encode a request to send (RTS) or a clear to send (CTS) and a plurality of training fields (TRN-R) at the end of the CTS or RTS; and configure a wireless device to transmit the RTS or the CTS and the plurality of TRN-R in a directional way to a second wireless.

In Example 44, the subject matter of Example 43 optionally includes where the instructions further configure the one or more processors to cause the apparatus to: encode an indication field in the RTS or the CTS that indicates that the plurality of TRN-R are to be transmitted after the RTS or the CTS.

Example 45 is a method performed by an apparatus of a wireless device, the method including: encoding a request to send (RTS) or a clear to send (CTS) and a plurality of training fields (TRN-R) at the end of the CTS or RTS; and configuring a wireless device to transmit the RTS or the CTS and the plurality of TRN-R in a directional way to a second wireless.

In Example 46, the subject matter of Example 45 optionally includes the method further including: encoding an indication field in the RTS or the CTS that indicates that the plurality of TRN-R are to be transmitted after the RTS or the CTS.

Example 47 is an apparatus of a wireless device, the apparatus including: means for encoding a request to send (RTS) or a clear to send (CTS) and a plurality of training fields (TRN-R) at the end of the CTS or RTS; and means for configuring a wireless device to transmit the RTS or the CTS and the plurality of TRN-R in a directional way to a second wireless.

In Example 48, the subject matter of Example 47 optionally includes the apparatus further including: means for encoding an indication field in the RTS or the CTS that indicates that the plurality of TRN-R are to be transmitted after the RTS or the CTS.

In Example 49, the subject matter of any one or more of Examples 47-48 optionally include the apparatus further including means for processing radio signals.

In Example 50, the subject matter of Example 49 optionally includes the apparatus further including means for transmitting and receiving radio signals.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device, the apparatus comprising:
   memory; and
   processing circuitry coupled to the memory, the processing circuitry configured to:
   decode a received frame, the frame comprising either a request to send (RTS) frame or a clear to send (CTS) frame, an initial portion of the frame indicating a plurality of training fields (TRN-R) at an end of the frame; and
   perform a clear channel assessment (CCA) for each receive (Rx) sector of a plurality of Rx sectors using the plurality of TRN-Rs.

2. The apparatus of claim 1, wherein the frame comprises an indication of a duration for the wireless device to defer from accessing a wireless medium, and wherein the processing circuitry is further configured to:
   if the CCA indicates the wireless medium for an Rx sector of the plurality is busy, set a network allocation vector (NAV) of the Rx sector to the duration.

3. The apparatus of claim 2, wherein the processing circuitry is further configured to:
   if the CCA indicates the wireless medium for the Rx sector of the plurality is idle, set the NAV of the Rx sector to a previous NAV of the Rx sector.

4. The apparatus of claim 3, wherein the previous NAV is a value of the NAV for the Rx sector before the CCA is performed for the Rx sector.

5. The apparatus of claim 1, wherein the processing circuitry is further configured to:
   determine a signal to noise ratio (SNR) for each of the plurality of Rx sectors; and
   if the SNR ratio is below a threshold for an Rx sector of the plurality, refrain from transmitting in a directional way on the Rx sector.

6. The apparatus of claim 1, wherein the processing circuitry is further configured to:
   switch from an omni-receive mode for the CCA and perform the CCA for the plurality of Rx sectors using a directional CCA for each of the TRN-Rs at the end of the frame.

7. The apparatus of claim 1, wherein when the received frame is an RTS frame, the RTS frame is not addressed to the wireless device.

8. The apparatus of claim 1, wherein when the received frame is an RTS frame, the processing circuitry is further configured to:
   if the RTS frame is not addressed to the wireless device, set a network allocation vector (NAV) as busy based on a duration in the RTS frame, and if the wireless device is counting down to access the wireless medium, stop counting down.

9. The apparatus of claim 1, wherein the processing circuitry is further configured to:
   if the CCA indicates that one Rx sector of the Rx sectors is idle and a CCA for the one Rx sector indicates the one Rx sector is idle for a CTS-timeout duration, encode a packet for transmission; and
   configure the wireless device to transmit the encoded packet in a directional way in the one Rx sector.

10. The apparatus of claim 9, wherein the processing circuitry is further configured to:
if the CCA indicates that one Rx sector of the Rx sectors is idle and a CCA for the one Rx sector indicates the Rx sector is idle for a reuse timeout period, encode a packet for transmission, wherein the reuse timeout period is at least as large as the CTS-timeout duration; and
configure the wireless device to transmit the encoded packet in a directional way in the one Rx sector.

11. The apparatus of claim 9, wherein the processing circuitry is further configured to:
configure the wireless device to transmit the packet in a directional way in the one Rx sector in accordance with at least one of orthogonal frequency division multiple-access (OFDMA) and multi-user multiple-input multiple-output (MU-MIMO).

12. The apparatus of claim 11, wherein when the received frame is an RTS frame, the RTS frame is received from a second wireless device and the reuse timeout period is at least a duration to enable the second wireless device to receive the CTS frame and to begin transmitting a physical (PHY) layer convergence procedure (PLCP) protocol data units (PPDU).

13. The apparatus of claim 11, wherein the processing circuitry is further configured to:
decode the frame and stop a backoff countdown if the wireless device was performing the backoff countdown;
continue the backoff countdown; and
configure the wireless device to transmit in the directional way in the one Rx sector if the backoff countdown equals to zero.

14. The apparatus of claim 1, wherein the wireless device is at least one from the following group: an Institute of Electrical and Electronic Engineers (IEEE) 802.11ay access point, an IEEE 802.11ay station, an IEEE 802.11 station, and an IEEE 802.11 access point.

15. The apparatus of claim 1, wherein the received frame was the RTS frame, and wherein the processing circuitry is further configured to:
decode a received CTS frame, wherein a second initial portion of the CTS frame indicates a second plurality of TRN-R at an end of the CTS frame; and
perform a second CCA for each Rx sector of the plurality of Rx sectors using the second plurality of TRN-Rs.

16. The apparatus of claim 1, further comprising transceiver circuitry coupled to the processing circuitry.

17. The apparatus of claim 16, further comprising one or more antennas coupled to the transceiver circuitry.

18. A non-transitory computer-readable storage medium that stores instructions for execution by one or more processors, the instructions to configure the one or more processors to cause an apparatus of a wireless device to:
decode a received frame, the frame comprising either a request to send (RTS) frame or a clear to send (CTS) frame, an initial portion of the frame indicating a plurality of training fields (TRN-R) at an end of the frame; and
perform a clear channel assessment (CCA) for each receive (Rx) sector of a plurality of Rx sectors using the plurality of TRN-Rs.

19. The non-transitory computer-readable storage medium of claim 18, wherein the instructions further configure the one or more processors to cause the apparatus to:
if the CCA indicates the wireless medium for an Rx sector of the plurality is busy, set a network allocation vector (NAV) of the Rx sector to the duration, wherein the frame comprises an indication of the duration for the wireless device to defer from accessing a wireless medium.

20. The non-transitory computer-readable storage medium of claim 18, wherein the instructions further configure the one or more processors to cause the apparatus to:
if the CCA indicates the wireless medium for the Rx sector of the plurality is idle, set the NAV of the Rx sector to a previous NAV of the Rx sector.

21. A method performed by a wireless device, the method comprising:
decoding a received frame, the frame comprising either a request to send (RTS) frame or a clear to send (CTS) frame, an initial portion of the frame indicating a plurality of training fields (TRN-R) at an end of the frame; and
performing a clear channel assessment (CCA) for each receive (Rx) sector of a plurality of Rx sectors using the plurality of TRN-Rs.

22. The method of claim 21, the method further comprising:
if the CCA indicates that one Rx sector of the Rx sectors is idle and a CCA for the one Rx sector indicates the one Rx sector is idle for a CTS-timeout duration, encoding a packet for transmission; and
configuring the wireless device to transmit the encoded packet in a directional way in the one Rx sector.

* * * * *